(12) United States Patent
Lee et al.

(10) Patent No.: US 10,594,803 B2
(45) Date of Patent: Mar. 17, 2020

(54) METHOD FOR DELIVERING CONTENT IN COMMUNICATION NETWORK AND APPARATUS THEREFOR

(71) Applicant: SK Telecom Co., Ltd., Seoul (KR)

(72) Inventors: Jongmin Lee, Seongnam-si (KR);
Yonghwan Ho, Incheon (KR);
Kyungjun Lee, Seongnam-si (KR);
Arum Kwon, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 593 days.

(21) Appl. No.: 14/818,265

(22) Filed: Aug. 4, 2015

(65) Prior Publication Data

US 2015/0341449 A1 Nov. 26, 2015

Related U.S. Application Data

(63) Continuation of application No. PCT/KR2014/003653, filed on Apr. 25, 2014.

(30) Foreign Application Priority Data

Jun. 10, 2013 (KR) ........................ 10-2013-0065989

(51) Int. Cl.
*G06F 15/16* (2006.01)
*H04L 29/08* (2006.01)
(Continued)

(52) U.S. Cl.
CPC .......... *H04L 67/16* (2013.01); *H04L 12/6418* (2013.01); *H04L 51/08* (2013.01);
(Continued)

(58) Field of Classification Search
CPC ..... H04L 67/16; H04L 12/6418; H04L 51/08; H04L 67/02; H04L 67/1095; H04L 67/2842; H04L 67/42
(Continued)

(56) References Cited

U.S. PATENT DOCUMENTS

| 6,542,964 B1 * | 4/2003 | Scharber | ................. H04L 29/06 711/122 |
| 6,792,510 B1 * | 9/2004 | Wootton | ............. G06F 12/0815 707/999.202 |

(Continued)

FOREIGN PATENT DOCUMENTS

| CN | 1431800 A | 7/2003 |
| CN | 102056333 A | 5/2011 |

(Continued)

OTHER PUBLICATIONS

Chinese Office Action dated Jul. 4, 2017 from SIPO in connection with the counterpart Chinese Patent Application No. 201480011508.X, citing the above reference(s).

(Continued)

*Primary Examiner* — Anthony Mejia
(74) *Attorney, Agent, or Firm* — Hauptman Ham, LLP

(57) ABSTRACT

A cache control device for content delivery, includes: an interface module to communicate with a cache device and a content server; a storage module to store a service list in which service types of respective content servers are recorded; and a control module to identify the content server from at least one of (i) a content request message received from the interface module and requesting content and (ii) a content response message received from the interface module and delivering the content, determine a service type of the content server with reference to the service list stored in the storage module, and perform control so that an indicator (Continued)

indicating the determined service type is transmitted to the cache device through the interface module.

5 Claims, 9 Drawing Sheets

(51) Int. Cl.
    *H04L 29/06* (2006.01)
    *H04L 12/64* (2006.01)
    *H04L 12/58* (2006.01)
(52) U.S. Cl.
    CPC .......... *H04L 67/02* (2013.01); *H04L 67/1095* (2013.01); *H04L 67/2842* (2013.01); *H04L 67/42* (2013.01)
(58) Field of Classification Search
    USPC ........................................................ 709/203
    See application file for complete search history.

(56) References Cited

U.S. PATENT DOCUMENTS

| | | | | |
|---|---|---|---|---|
| 7,283,135 | B1* | 10/2007 | Cote | G06T 19/00 345/419 |
| 7,873,609 | B2* | 1/2011 | Kim | G06F 16/182 707/694 |
| 8,180,720 | B1* | 5/2012 | Kovacs | H04L 67/2842 706/47 |
| 8,533,293 | B1* | 9/2013 | Sivasubramanian | H04L 67/2842 709/219 |
| 9,055,124 | B1* | 6/2015 | Hill | H04L 65/403 |
| 9,953,052 | B1* | 4/2018 | Hill | H04L 67/42 |
| 2002/0138551 | A1* | 9/2002 | Erickson | H04L 29/06 709/203 |
| 2005/0102260 | A1* | 5/2005 | Spring | G06F 21/6245 |
| 2007/0050491 | A1* | 3/2007 | Kataoka | H04L 67/2814 709/223 |
| 2008/0040545 | A1* | 2/2008 | Twiss | H04L 12/1886 711/119 |
| 2008/0177859 | A1* | 7/2008 | Nickerson | H04L 67/02 709/217 |
| 2009/0254707 | A1* | 10/2009 | Alstad | H04L 67/2847 711/118 |
| 2010/0094817 | A1 | 4/2010 | Ben-Shaul et al. | |
| 2010/0142516 | A1* | 6/2010 | Lawson | H04M 7/0021 370/352 |
| 2011/0149991 | A1* | 6/2011 | Jiang | H04L 47/10 370/429 |
| 2011/0153937 | A1* | 6/2011 | Annamalaisami | G06Q 10/10 711/118 |
| 2012/0102136 | A1* | 4/2012 | Srebrny | H04L 12/1886 709/213 |
| 2012/0303697 | A1* | 11/2012 | Alstad | G06F 16/9574 709/203 |
| 2013/0007235 | A1* | 1/2013 | Humphreys | G06F 16/9574 709/223 |
| 2013/0151649 | A1* | 6/2013 | Luna | H04W 28/02 709/213 |
| 2013/0179489 | A1* | 7/2013 | Daley | H04L 67/2828 709/203 |
| 2014/0122637 | A1* | 5/2014 | Wan | H04L 67/2842 709/213 |
| 2014/0258391 | A1* | 9/2014 | Sun | H04L 67/2842 709/203 |
| 2015/0006681 | A1* | 1/2015 | Lim | H04L 67/02 709/219 |
| 2016/0359998 | A1* | 12/2016 | Yanagihara | H04L 67/2842 |

FOREIGN PATENT DOCUMENTS

| | | |
|---|---|---|
| CN | 103024001 A | 4/2013 |
| KR | 10-2005-0060797 B1 | 6/2005 |
| KR | 1020060070287 A | 6/2006 |
| KR | 1020100047831 A | 5/2010 |
| KR | 1020110014120 A | 2/2011 |
| KR | 1020120057027 A | 6/2012 |
| WO | 2013048717 A1 | 4/2013 |

OTHER PUBLICATIONS

International Search Report dated Aug. 20, 2014 for PCT/KR2014/003653, citing the above references.

Korean Office Action dated May 21, 2019, in connection with counterpart Korean Patent Application No. 10-2013-0065989, citing the above references.

* cited by examiner ns in the content delivery system according to exemplary embodiments of the present disclosure.

METHOD FOR DELIVERING CONTENT IN COMMUNICATION NETWORK AND APPARATUS THEREFOR

CROSS-REFERENCE TO RELATED APPLICATIONS

The present application is a continuation of International Application No. PCT/KR2014/003653 filed on Apr. 25, 2014, which is based on, and claims priority from Korean Patent Application No. 10-2013-0065989 filed in the Korean Intellectual Property Office on Jun. 10, 2013. The disclosures of the above-listed application are hereby incorporated by reference herein in their entirety.

TECHNICAL FIELD

The present disclosure relates to content delivery technology, and more particularly, to a method of delivering content to user equipment (UE) in differentiated ways according to a service type and a device for the method.

BACKGROUND

Lately, the performance of user equipment (UE), such as a smart phone, and mobile communication technology are rapidly developing. Accordingly, a user has become able to access a web server provided by a content provider (CP) and use a variety of content, such as photographs, videos, audio, and applications, through UE at any time and any place. Also, the frequency of using content through a mobile network (e.g., a mobile communication network) in which the mobility of a user is ensured is continuously increasing.

However, while the number of web servers provided by a CP is limited, the number of users who want to access the web servers is rapidly increasing. For this reason, the inventor(s) has noted that various needs related to improve communication resource and quality of service, by reducing, for example, data loss, bottlenecks, transmission delay, and data discontinuity, have occurred. The inventor(s) has noted that to solve these needs, a content delivery network (CDN) has been provided.

A CDN is a service for stably delivering various types of content, such as photographs, movies, and music videos, to one or more UEs. More specifically, the CDN provides cache devices which are widely distributed to major points in a network. The inventor(s) has noted that such cache devices copy and store in advance a part or all of a variety of content, which is content having a large capacity, such as images, videos, and audio, or frequently requested by one or more UEs, present in web servers of a CP far away from the UEs. Subsequently, when a content request message is received from the UEs, a cache device located closest to the UEs transmits content to the UEs. The inventor(s) has noted that the CDN improves content access speed and stably provides content.

SUMMARY

In accordance with some embodiments, a cache control device for content delivery comprises an interface module, a storage module, and a control module. The interface module is configured to communicate with a cache device and a content server. The storage module is configured to store a service list in which service types of respective content servers are recorded. And the control module is configured to identify the content server from at least one of (i) a content request message received from the interface module and requesting content and (ii) a content response message received from the interface module and delivering the content, determine a service type of the content server with reference to the service list stored in the storage module, and perform control so that an indicator indicating the determined service type is transmitted to the cache device through the interface module.

In accordance with some embodiments, a cache device for content delivery comprises an interface unit, a storage unit and a control unit. The interface unit is configured to communicate with user equipment (UE) and a cache control device. The storage unit having a storage space is configured to store a plurality of contents according to service types. And the control unit is configured to identify a service type through a received indicator indicating a service type of a content server when receiving the indicator from the cache control device through the interface unit, and perform control so that content is transmitted to the UE in different ways according to the identified service type.

In accordance with some embodiments, a method performed by a cache control device for content delivery, the method comprises identifying a content server from at least one of a content request message for requesting content and a content response message for delivering the content; determining a service type of the content server with reference to a service list in which service types of respective content servers are recorded; and transmitting an indicator indicating the determined service type to a cache device.

DETAILED DESCRIPTION

Figure 1:
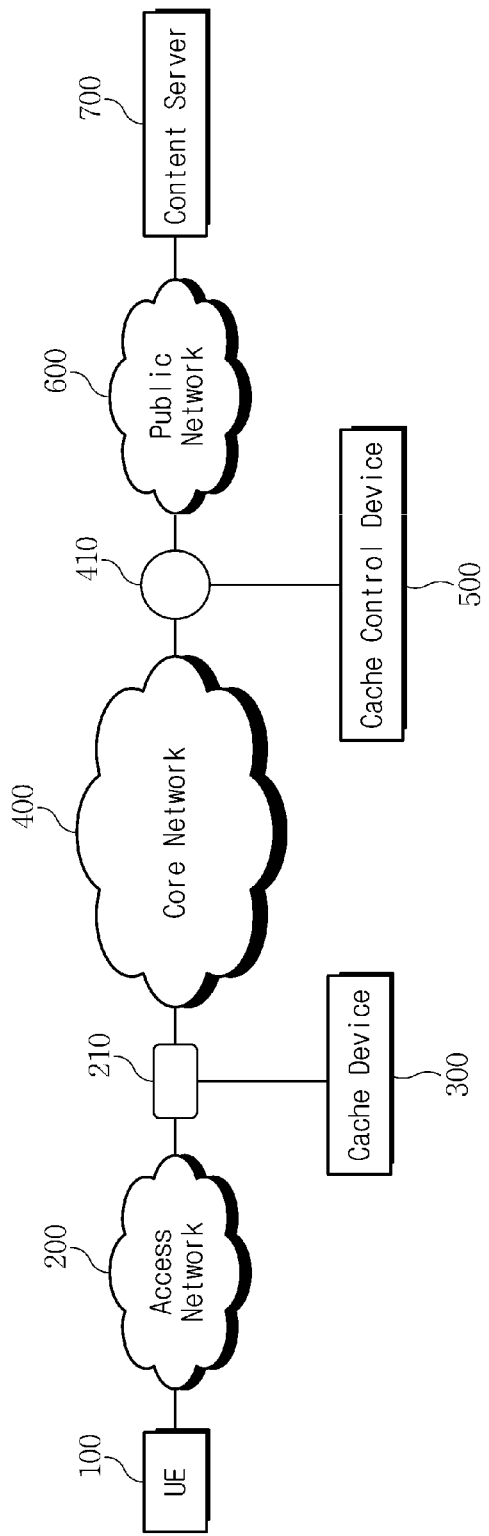
FIG. 1 is a diagram of a content delivery system according to exemplary embodiments of the present disclosure.

Hereinafter, exemplary embodiments of the present disclosure that enable those of ordinary skill in the art of the present disclosure to implement some embodiments of the present disclosure will be described in detail with reference to the accompanying drawings. In the detailed description of exemplary embodiments of the present disclosure, when detailed descriptions on the known art related to the present are determined to unnecessarily obscure the gist of the present disclosure, the detailed descriptions will be omitted. This is intended not to obscure but to clearly deliver the core of the present disclosure by omitting unnecessary descriptions. Some embodiments of the present disclosure are directed to providing a method capable of providing a content delivery service in differentiated ways according to a service type, and a device for the method.

Some embodiments of the present disclosure are also directed to providing a method capable of providing a content delivery service in which the load of an original server supplying content is reduced, and a device for the method. Some embodiments of the present disclosure are also directed to providing a method capable of providing a content delivery service in which traffic in a network can be reduced, and a device for the method. In particular, according to some embodiments of the present disclosure, in the case of a first service, transmission of a content server is stopped, and a cache device alone delivers content to UE, so that the load of the corresponding process put on the content server itself can be removed. According to some embodiments of the present disclosure, in the case of a second service, data transmitted from the content server is not actually delivered. Rather, a cache control device controls the cache device to transmit the same data through a transmission control indicator including label information. Accordingly, while the load of the content server remains as it is, traffic in a network is reduced and transmission delay is prevented. In particular, the present disclosure makes it possible to identify a service target from a message transmitted and received between the UE and the content server and to manage a target according to service types through a service list. Accordingly, it is possible to provide differentiated services according to service types. When an element is referred to as being "connected" or "coupled" to another element, it can be directly connected or coupled to the other element, or intervening elements is present. The terminology used in this specification is for the purpose of describing particular embodiments only and is not intended to be limiting of the disclosure. The singular forms "a," "an," and "the" are intended to include the plural forms as well, unless the context clearly indicates otherwise. The terms "comprises," "comprising," "includes," and "including," when used herein, specify the presence of stated features, numbers, steps, operations, elements, parts, or combinations thereof, but do not preclude the presence or addition of one or more other features, numbers, steps, operations, elements, parts, or combinations thereof.

When an element is referred to as being "connected" or "coupled" to another element, it can be directly connected or coupled to the other element or intervening elements may be present. The terminology used in this specification is for the purpose of describing particular embodiments only and is not intended to be limiting of the invention. The singular forms "a," "an," and "the" are intended to include the plural forms as well, unless the context clearly indicates otherwise. The terms "comprises," "comprising," "includes," and "including," when used herein, specify the presence of stated features, numbers, steps, operations, elements, parts, or combinations thereof, but do not preclude the presence or addition of one or more other features, numbers, steps, operations, elements, parts, or combinations thereof.

The terms, such as "first" and "second," are used to describe various elements. The terms are merely used to distinguish one element from other elements, but are not used to limit the elements. Throughout the drawings, like numerals refer to portions that perform similar functions and exert similar effects, and duplicate descriptions of the portions will be omitted.

FIG. 1 is a diagram of a content delivery system according to exemplary embodiments of the present disclosure.

Referring to FIG. 1, a content delivery system according to embodiments of the present disclosure includes user equipment (UE) 100, a cache device 300, a cache control device 500, and a content server 700. Other components of the content delivery system, such as the cache device 300, the cache control device 500 are implemented by one or more processors and/or application-specific integrated circuits (ASICs). The cache device 300 includes a communication module to transmit signals (e.g., instructions or controls to perform a content delivery between the cache device and the cache control device) to and/or receive signals from the cache control device 500. The cache control device 500 includes a communication module to transmit signals (e.g., instructions or controls to perform a content delivery between the cache device and the cache control device) to and/or receive signals from the cache device 300.

The UE 100 accesses the content server 700 through an access network 200, a core network 400, and a public network 600. The access network 200 is a network including network entities which provide a wireless zone service in a cellular system. For example, the access network 200 is implemented by a plurality of base stations (BSs), such as a base transceiver station (BTS) and a node base station (NodeB), and a base station controller (BSC), such as a radio network controller (RNC). In another example, the access network 200 is implemented by one entity such as an evolved node base station (eNodeB). In still another example, the access network 200 includes a digital unit (DU) and a radio unit (RU). The DU and the RU are configured by separating a digital signal processing unit and a wireless signal processing unit integrally implemented in a base station from each other. Here, a plurality of RUs are connected to one DU. The core network 400 manages user information, which is information on users who are provided with a communication service, and performs circuit switching or packet switching. Also, the core network 400 manages inter-frequency mobility, and manages and controls traffic in the access network 200 and the core network 400 and interoperation with another network, for example, the public network 600. The core network 400 includes entities which perform the aforementioned functions. These entities are exemplified by a mobile switching center (MSC), a home location register (HLR), a mobile mobility entity (MME), a home subscriber server (HSS), and so on. The public network 600 is a general open network in which information is exchanged according to transmission control protocol/Internet protocol (TCP/IP). Such a public network 600 is exemplified by the Internet which employs IP. The public network 600 is connected to the content server 700.

The content server 700 is configured to store content and provide a variety of content to the UE 100 upon request. Here, content is exemplified by photographs, videos, audio, applications, and so on. The content server 700 is a server run by a so-called content provider (CP), and may provide content to a plurality of pieces of UE 100. Such a content server 700 is exemplified by a web server, a web application server (WAS), and so on.

The UE 100 is configured to receive content from the content server 700 and reproduce the content upon request of a user. For example, the UE 100 finds a uniform resource locator (URL) of content requested by the user. After that, the UE 100 acquires address information (an IP address) of the content server 700 corresponding to the URL through a domain name system (DNS) or so on. The UE 100 requests the content from the content server 700 corresponding to the address information and receives the content.

The cache device 300 is located between the access network 200 and the core network 400, and the cache control device 500 is located between the core network 400 and the public network 600. In other words, the cache device 300 and the cache control device 500 are located between the UE 100 and the content server 700. Here, a reference number 210 indicates a switch connecting the access network 200 and the core network 400, and a reference number 410 indicates a switch connecting the core network 400 and the public network 600. Here, the cache device 300 and the cache control device 500 are connected to networks through the switches 210 and 410, respectively, but the present disclosure is not limited thereto. It is preferable to design a network topology so that all data transmitted and received between the UE 100 and the content server 700 passes through the cache device 300 and the cache control device 500. As long as such a network topology is designed, the cache device 300 and the cache control device 500 are disposed at any locations.

According to the above-described system configuration, a content request from the UE 100 is required to be delivered to the content server 700 via the cache device 300 and the cache control device 500. Also, content (data) transmitted to the UE 100 by the content server 700 is required to be delivered to the UE 100 via the cache control device 500 and the cache device 300. Accordingly, the cache control device 500 identifies the domain of the content server 700 from information included in the header of a content request message transmitted to the content server 700 by the UE 100. Alternatively, the cache control device 500 identifies the domain of the content server 700 from information included in the header of a content response message transmitted to the UE 100 by the content server 700.

The cache device 300 and the cache control device 500 provide various types of content delivery network (CDN) service. For example, a first service is provided in which the cache device 300 alone provides content to the UE 100 without putting a load on the content server 700. Alternatively, a second service is provided in which the load of the content server 700 is not reduced but traffic in a network is reduced. Various types of service are provided in addition to such a service. Therefore, the cache device 300 and the cache control device 500 classify these service types and provide services. To this end, the cache control device 500 has a service list in which types of service to be provided for content transmission are classified and stored. In the service list, service targets are classified according to service types. Therefore, the cache control device 500 extracts a domain from a message transmitted between the UE 100 and the content server 700. After that, with reference to the service list, the cache control device 500 determines the type of a service to be provided for the transmission of content of the content server 700. For example, the cache control device 500 classifies service types for the content server 700 or content of the content server 700 using the service list. The cache control device 500 shares the service types with the cache device 300 and provides services using methods corresponding to the services types.

The cache device 300 is located between the access network 200 and the core network 400, and receives a copy of a part or all of content from the content server 700 and store the received copy. According to an exemplary embodiment, the cache device 300 uses a mirroring method of copying and storing traffic transmitted from the content server 700 to the UE 100. According to another exemplary embodiment, using a caching method, the cache device 300 receives and stores content from the content server 700 in advance. After that, the cache device 300 transmits the content to the UE 100 instead of the content server 700 according to a service method indicated by the cache control device 500.

The cache device 300 and the cache control device 500 are located between the UE 100 and the content server 700, and monitor packets exchanged between the UE 100 and the content server 700 and hijack a packet related to content transmission among the packets.

In particular, when the cache device 300 transmits content to the UE 100 instead of the content server 700 according to control of the cache control device 500, the cache device 300 processes the content as a packet transmitted by the content server 700 using the IP address of the content server 700 and transmits the packet.

Figure 2:
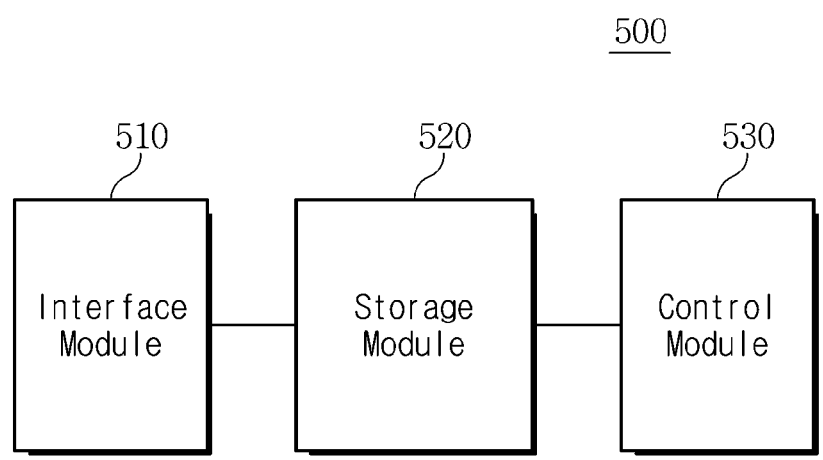
FIG. 2 is a block diagram of a configuration of a cache control device in the content delivery system according to exemplary embodiments of the present disclosure.

In this way, the cache device 300 and the cache control device 500 provide a content transmission service while the UE 100 and/or the content server 700 do not recognize the provision of a content transmission service. FIG. 2 is a block diagram of a configuration of a cache control device in the content delivery system according to embodiments of the present disclosure.

Referring to FIG. 2, the cache control device 500 according to embodiments of the present disclosure includes an interface module 510, a storage module 520, and a control module 530. The control module 530 is implemented by one or more processors and/or application-specific integrated circuits (ASICs). The interface module 510 includes a communication module to transmit signals (e.g., various data) to and/or receive the signals from the core network 400 or the public network 600.

The interface module 510 is configured to monitor various data transmitted and received through the core network 400 or the public network 600 or to transmit and receive such data. In particular, the interface module 510 is configured to communicate with the cache device 300 and the content server 700 connected to the UE 100. To this end, the interface module 510 includes a mirroring module (not shown in FIG. 2) and an injection module (not shown in FIG. 2). The mirroring module copies data delivered through the core network 400 or the public network 600 and delivers the data to the control module 530. The injection module transmits data received from the control module 530 to the cache device 300 or the content server 700 through the core network 400 or the public network 600. Therefore, through the connection with the UE 100, the interface module 510 receives a content request message with which the UE 100 requests content from the content server 700. Also, through the connection with the content server 700, the interface module 510 receives a content response message with which the content server 700 provides content to the UE 100.

The storage module 520 is configured for data storage. In some embodiments, the storage module 520 includes at least one non-transitory computer-readable recording medium as described herein. The storage module 520 stores a service list according to exemplary embodiments of the present disclosure. In the service list, the service types of respective content servers 700 are recorded. In other words, the type of a service to be provided for content transmission is determined by the service list. Such a service list stores identification information for identifying a service target and a service (e.g., the first service or the second service) to be applied to the service target indicated by the identification information. For example, when the first service is provided to a service target, the first service is stored in the list, and when the second service is provided, the second service is stored in the list. Here, identification information is a domain, a URL in which specific content is stored, or so on. Therefore, in a service list according to exemplary embodiments of the present disclosure, service targets are classified in units of the content servers 700 or in units of content. When service targets are classified in units of the content servers 700, the same kind of service is provided to all content of a content server 700. When service targets are classified in units of content, different types of services are provided to respective pieces of content stored in a content server 700. In exemplary embodiments described below, it is assumed that service types are classified in a service list according to content servers 700. However, the present disclosure is not limited thereto, and service types are classified according to pieces of content. Therefore, in a service list according to an embodiment of the present disclosure, the domains of the content servers 700 are mapped to service types and stored. Accordingly, the control module 530 extracts a domain from the header of a message transmitted between the UE 100 and a content server 700. With reference to the service list stored in the storage module 520, the control module 530 determines the type of a service to be applied when the content server 700 transmits content.

The control module 530 exchanges messages with the UE 100 through the interface module 510 via the cache device 300. In this way, the control module 530 establishes a connection with the UE 100 via the cache device 300. Also, the control module 530 exchanges messages with a content server 700, thereby establishing a connection with the content server 700.

When the connection is established as described above, the control module 530 receives a content request message (e.g., hypertext transfer protocol (HTTP) get) with which the UE 100 requests content from the content server 700 through the interface module 510. Also, the control module 530 receives a content response message (e.g., HTTP response) with which the content server 700 provides the content to the UE 100 through the interface module 510. Accordingly, the control module 530 identifies the content server 700 through information (e.g., a URL or a DNS) extracted from the content request message or the content response message. After that, the control module 530 determines the type of a service to be provided to the content server 700 or for content transmission of the content server 700 with reference to the service list stored in the storage module 520.

When it is determined to be the first service, the control module 530 notifies the cache device 300 that the type of a service to be provided for the corresponding content transmission is the first service through the interface module 510. The control module 530 determines that the cache device 300 has the content according to a cache check indicator received through the interface module 510. The cache check indicator is transmitted to provide a notification that the cache device 300 stores the corresponding content.

When the cache check indicator is received, the control module 530 notifies the content server 700 through the interface module 510 not to transmit the content any more in the case of retransmission. Also, after the connection with the UE 100 is released (CONNECTION HIJACKING) due to hijacking by the cache device 300, the control module 530 establishes a tunnel with the cache device 300 and release the connection with the content server 700.

When the service to be provided is determined as the second service, the control module 530 notifies, through the interface module 510, the cache device 300 that the type of a service to be provided for the corresponding content transmission is the second service. The control module 530 determines whether or not the cache device 300 stores the content which is a target of the second service depending on whether or not a cache check indicator is received. When it is determined that the cache device 300 stores the content, the control module 530 transmits a transmission control indicator to the cache device 300 through the interface module 510. Here, the transmission control indicator causes the cache device 300 to transmit unit data of content (e.g., a chunk or a packet) identical to unit data of content transmitted by the content server 700. To this end, the transmission control indicator includes label information which indicates unit data to be transmitted by the cache device 300. For example, it is assumed that the content includes first unit data to tenth unit data. Also, it is assumed that the content server 700 transmits the fourth to the sixth unit data to the UE 100. Accordingly, the control module 530 receives the fourth to sixth unit data from the content server 700 through the interface module 510. At this time, the control module 530 does not transmit the received fourth to sixth unit data to the cache device 300 through the interface module 510. Rather, the control module 530 transmits only label information for identifying the fourth to sixth unit data. To this end, the control module 530 compresses all or a part of the unit data transmitted by the content server 700 and use the compressed data as label information. Alternatively, the control module 530 generates a hash value from the unit data transmitted by the content server 700 using a hash algorithm predetermined by mutual consent with the cache device 300. Also, the control module 530 uses the generated hash value as label information. Accordingly, it is possible to reduce traffic in the core network 400 between the cache control device 500 and the cache device 300.

In addition, the control module 530 adjusts the transmission rate of a transmission control indicator to eliminate transmission delay between the cache control device 500 and the content server 700. For example, as the transmission control indicator is received from the cache control device 500, the cache device 300 transmits stored content to the UE 100. Assuming that the arrival time (round-trip time (RTT)) of unit data of the content from the content server 700 to the cache control device 500 is 10 ms, the cache control device 500 transmits label information of unit data to the cache device 300 at intervals of 10 ms irrespective of whether or not unit data arrives from the content server 700. Accordingly, the cache device 300 transmits unit data corresponding to label information received at intervals of 10 ms to the UE 100. Therefore, even when there is a delay between the cache control device 500 and the content server 700, it is possible to provide content to the UE 100 at a stable speed. Meanwhile, when the cache device 300 does not have the corresponding content, the control module 530 transmits pieces of content sequentially received from the content server 700 to the cache device 300 irrespective of the first service or the second service.

Figure 3:
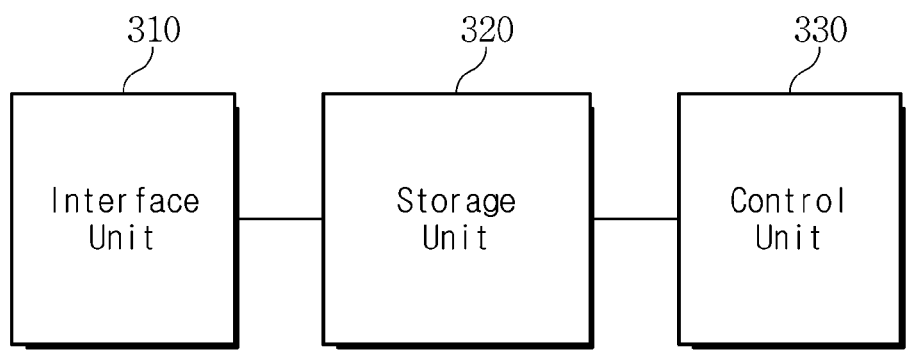
FIG. 3 is a block diagram of a configuration of a cache device in the content delivery system according to exemplary embodiments of the present disclosure.

FIG. 3 is a block diagram of a configuration of a cache device in the content delivery system according to exemplary embodiments of the present disclosure.

Referring to FIG. 3, the cache device 300 includes an interface unit 310, a storage unit 320, and a control unit 330. The control module 330 is implemented by one or more processors and/or application-specific integrated circuits (ASICs). The interface module 310 includes a communication module to transmit signals (e.g., various data) to and/or receive the signals from the cache device 300, the core network 400 and/or the public network 600. In some embodiments, the storage module 320 includes at least one non-transitory computer-readable recording medium as described herein.

The interface unit 310 monitors, or transmits and receives various data transmitted and received through the access network 200 or the core network 400. In particular, the interface unit 310 communicates with the UE 100 and is configured to communicate with the cache control device 500 connected to the content server 700. To this end, the interface unit 310 includes a mirroring module (not shown) and an injection module (not shown). The mirroring module copies data delivered through the access network 200 or the core network 400 and delivers the data to the control unit 330. The injection module transmits data received from the control unit 330 to the UE 100 or the cache control device 500 through the access network 200 or the core network 400. Therefore, the interface unit 310 receives a content request message with which the UE 100 requests content from the content server 700. Also, the interface unit 310 receives a content response message with which the content server 700 provides content to the UE 100.

The storage unit 320 stores the copy of a part or all of each piece of content stored in at least one content server 700. According to the mirroring technology, the control unit 330 copies traffic transmitted from the content server 700 to the UE 100 and stores the traffic in the storage unit 320. Alternatively, the control unit 330 receives specific content from the content server 700 in advance and store the received content in the storage unit 320. The storage unit 320 assigns different storage spaces depending on service types according to embodiments of the present disclosure. For example, a first storage space is assigned for the first service, and a second storage space is assigned for the second service. Here, content in the first storage space is not deleted during a previously set time period. On the other hand, content in the second storage space is maintained or deleted according to the frequency thereof. A previously set capacity is assigned to the second storage space, and content is stored in the second storage space according to first-in first-out (FIFO) queuing. When there is a request for content, if or when the content is not stored in the second storage space, the content is received from the original server, that is, the content server 700. After that, the received content is input to and stored in a queue of the second storage space. At this time, since the second storage space is in accordance with FIFO queuing, first-stored content is deleted when there is not enough storage space to store new content. On the other hand, when there is a request for content, if or when the content is stored in the second storage space, the stored content is input again to the queue of the second storage space as if the content were stored again. In this way, content stored in the second storage space is deleted or maintained according to the frequency of request of the content.

The control unit 330 is configured to control overall operation of the cache device 300. The control unit 330 receives a content response message including an information response indicator through the interface unit 310. An information response indicator indicates the type of a service to be provided for specific content. Therefore, the control unit 330 finds the type of a service indicated by the information response indicator and to be provided for the corresponding content.

When the type of a service is the first service, the control unit 330 determines whether or not there is the content using a part of the content included in the received content response message. In the case of the first service, the content is stored in the first storage space of the storage unit 320 assigned for the first service. When it is determined that the storage unit 320 has the content, the control unit 330 notifies the cache control device 500 that the cache device 300 has the content through the interface unit 310.

Next, to provide the first service, the control unit 330 acquires information for connection establishment from an acknowledgement message transmitted from the UE 100. After that, the control unit 330 hijacks the connection between the UE 100 and the cache control device 500 and establishes a connection between the cache device 300 and the UE 100. Subsequently, the control unit 330 delivers a tunnel establishment request message for requesting tunnel establishment to the cache control device 500 through the interface unit 310, thereby establishing a tunnel with the cache control device 500. Then, the cache control device 500 releases the connection with the content server 700. The control unit 330 transmits retained content to the UE 100 through the connection with the UE 100. At this time, the control unit 330 periodically transmits a tunnel maintenance request message for requesting maintenance of the tunnel to the cache control device 500 so that the tunnel is maintained until all the retained content is transmitted.

Meanwhile, when the type of a service is the second service, the control unit 330 determines whether or not there is the content using a part of the content included in the content response message received from the cache control device 500. In the case of the second service, the content is stored in the second storage space of the storage unit 320 assigned for the second service. When it is determined that the storage unit 320 has the content, the control unit 330 notifies the cache control device 500 that the cache device 300 has the content through the interface unit 310. Accordingly, the cache control device 500 finds that cache device 300 has the content. Also, the cache control device 500 transmits a transmission control indicator including label information for identifying unit data to the cache device 300. The control unit 330 receives the transmission control indicator through the interface unit 310. After that, the control unit 330 transmits unit data constituting the content to the UE 100 through the interface unit 310 according to the label information of the transmission control indicator. For example, the cache control device 500 transmits a hash value to the cache device 300. Then, the control unit 330 of the cache device 300 extracts the corresponding unit data having the hash value from the storage unit 320 and transmit the extracted unit data to the UE 100 through the interface unit 310.

Meanwhile, when the storage unit 320 does not have content, the control unit 330 stores content received from the content server 700 through the interface unit 310 via the cache control device 500 irrespective of the first service or the second service. After that, the control unit 330 transmits the stored content to the UE 100. In another example, the control unit 330 receives content from the content server 700 via the cache control device 500. Then, the control unit 330 provides the received content to the UE 100 through the interface unit 310 using the mirroring technology. Along with the provision of the content, the control unit 330 stores the content received from the content server 700. In this way, when there is a request of other UE for the content later, the stored content is provided to the UE 100.

In addition, the control unit 330 processes content into packets transmitted by the content server 700 using the IP address of the content server 700 and transmit the packets to the UE 100. As a result, the UE 100 having requested the content from the content server 700 recognizes and receives the content transmitted by the cache device 300 as content transmitted by the content server 700.

Figure 4:
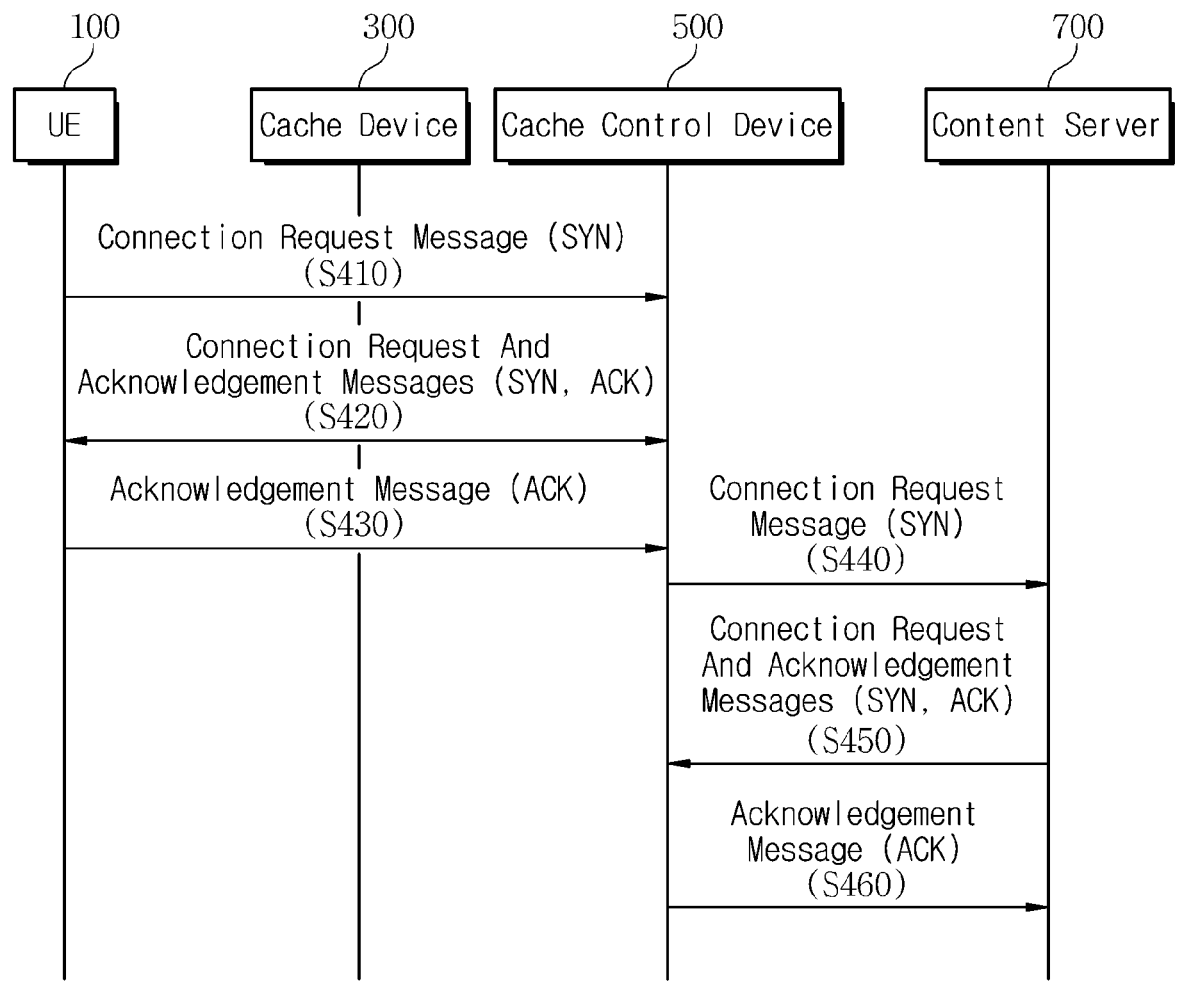
FIG. 4 is a flowchart of a method of connecting respective components for data transmission in the content delivery system according to exemplary embodiments of the present disclosure.

FIG. 4 is a flowchart of a method of connecting respective components for data transmission in the content delivery system according to exemplary embodiments of the present disclosure.

Referring to FIG. 4, in order for the UE 100 to receive data from the content server 700, a connection is required to be established between the UE 100 and the content server 700. According to exemplary embodiments of the present disclosure, the connection between the UE 100 and the cache control device 500 and the connection between the cache control device 500 and the content server 700 are separately established in operations S410 to S430 and operations S440 to S460, respectively. In at least one embodiment, TCP 3-way handshaking is used as an example. Steps S410 to S430 correspond to a connection process between the UE 100 and the cache control device 500, and steps S440 to S460 correspond to a connection process between the cache control device 500 and the content server 700. In other words, in step S410, the UE 100 transmits a connection request message SYN for the content server 700. Then, the cache control device 500 receives the connection request message SYN instead of the content server 700. Also, the cache control device 500 transmits connection request and acknowledgement messages SYN and ACK to the UE 100 instead of the content server 700 in response to the connection request message SYN in step S420. At this time, the cache control device 500 disguises the connection request and acknowledgement messages SYN and ACK as messages transmitted by the content server 700 using the IP address of the content server 700 and transmit the disguised messages.

Accordingly, the UE 100 transmits an acknowledgement message ACK to the content server 700 in step S430. Then, the cache control device 500 receives the acknowledgement message ACK instead of the content server 700. Consequently, a connection is established between the UE 100 and the cache control device 500.

Meanwhile, in step S440, the cache control device 500 transmits the connection request message SYN to the content server 700 instead of the UE 100. Then, the cache control device 500 receives connection request and acknowledgement messages SYN and ACK transmitted by the content server 700 in response to the connection request message SYN of the cache control device 500 instead of the UE 100 in step S450. After that, in step S460, the cache control device 500 transmits an acknowledgement message ACK to the content server 700 instead of the UE 100 in response to the connection request message SYN of the content server 700. In this way, a connection is established between the cache control device 500 and the content server 700. For reference, in steps S440 and S460, the connection request message SYN and the acknowledgement message ACK transmitted to the content server 700 are also be disguised as messages transmitted by the UE 100 using the IP address of the UE 100 and transmitted. In other words, after the cache control device 500 receives the connection request message of S410 from the UE 100, the cache control device 500 then transmits the connection request message to the content server 700.

According to exemplary embodiments of the present disclosure, when it is determined that content requested by the UE 100 is stored in the cache device 300, the cache control device 500 terminates the connection between the cache control device 500 and the content server 700. Even when the connection between the cache control device 500 and the content server 700 is terminated in this way, the UE 100 is not required to perform an additional procedure of establishing a new connection for the requested content. This is because, as mentioned above, the connection between the UE 100 and the cache control device 500 and the connection between the cache control device 500 and the content server 700 are separately established.

Figure 5:
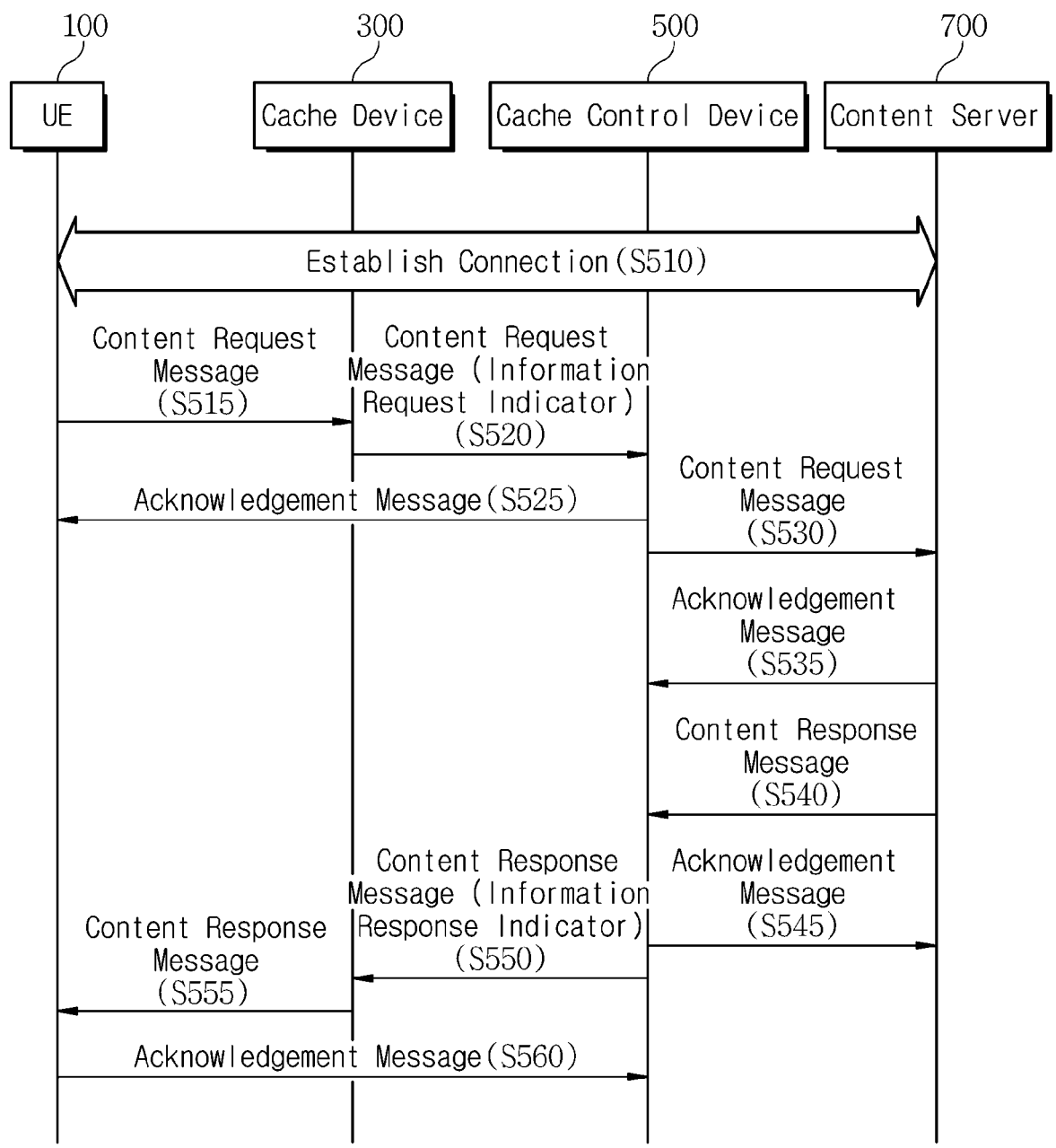
FIG. 5 is a flowchart of a method of delivering content according to exemplary embodiments of the present disclosure.

FIG. 5 is a flowchart of a method of delivering content according to exemplary embodiments of the present disclosure.

As shown in the drawing, it is assumed that the connection between the UE 100 and the cache control device 500 and the connection between the cache control device 500 and the content server 700 have been established in step S510 according to the procedure described with reference to FIG. 4.

The UE 100 transmits a content request message to request content from the content server 700. Then, according to the content request message, the content server 700 provides content to the UE 100. The content is divided into a plurality of pieces of unit data, which is sequentially included in a content response message and transmitted.

The cache control device 500 stores a service list to determine the type of a service to be provided when content is provided. In the service list, types of service to be provided according to content servers 700 are classified and stored. Therefore, the cache control device 500 determines a service to be provided through the service list. Through at least one of a received content request message and content response message, the cache control device 500 determines the type of a service to be provided. In other words, both the content request message and the content response message include the domain of the content server 700. Therefore, the cache control device 500 extracts the domain of the content server 700 from any one of the content request message and the content response message. After that, the cache control device 500 compares the domain of the content server 700 with the service list to determine a service to be provided for the corresponding content.

Here, the cache device 300 is required to provide a service according to the type of the service determined by the cache control device 500. Therefore, the cache device 300 states an information request indicator in a content request message transmitted from the UE 100 and delivers the content request message to the cache control device 500. In this way, the cache device 300 requests the cache control device 500 to provide the notification of a service type.

Also, the cache control device 500 determines a service type with reference to the service list. After that, the cache control device 500 provides a content response message to the cache device 300 in response to the content request message. Here, the transmitted content response message includes an information response indicator indicating the service type.

For example, when the content request message is an HTTP (Hypertext Transfer Protocol) GET message and the content response message is an HTTP response message, the aforementioned information request indicator and information response indicator is respectively included in the HTTP GET message and the HTTP response message and transmitted. At this time, the cache device 300 stores the information request indicator in a specific field of the content request message and transmit the content request message.

Accordingly, the cache control device 500 receives the information request indicator. Then, the cache control device 500 transmits the content response message including the information response indicator to the cache device 300. The cache control device 500 indicates that an information response indicator is included in a specific field of the content response message, states the information response indicator indicating the service type, and transmits the content response message.

Next, the content request message transmitted by the UE 100 is delivered to the content server 700 through the cache device 300 and the cache control device 500 in steps S515, S520, and S530. Accordingly, in step S525, the cache control device 500 transmits an acknowledgement (ACK) message for acknowledging the reception of the content request message. The ACK message is delivered to the UE 100 via the cache device 300. Such a content request message is, for example, an HTTP GET message. Also, in step S535, the content server 700 transmits an ACK message for acknowledging the reception of the content request message to the cache control device 500. In step S520, the cache device 300 performs a corresponding process (or operation) to include the information request indicator in the delivered content request message and delivers the content request message to the cache control device 500. Here, the information request indicator serves to inquire a service type of the cache control device 500. In other words, the cache device 300 requests the cache control device 500 to provide the notification of a service type (e.g., the first service or the second service) to be provided.

Meanwhile, the content server 700 receiving the content request message transmits the content response message. The content response message is transmitted to the UE 100 via the cache control device 500 and the cache device 300 in steps S540, S550, and S555. In the content response message, a part of content divided into unit data is included. As long as no special control is provided, the content server 700 continuously transmits content response messages until all the content is transmitted. The content is divided into pieces of unit data, and a predetermined number of pieces of unit data are included in a content response message and transmitted. Here, the unit data is a chunk. In the content response message transmitted in steps S540, S550, and S555, only a first piece of unit data among the plurality of pieces of unit data constituting the content is included. Here, the unit data is, for example, divided from content, which the content is provided in unit of a chunk or a packet. A chunk is a fragment of information which is used in many multimedia formats and is unit of data to provide the requested content with the UE, as exemplary embodiments of the present disclosure. A chunk has all or a part of the content to be provided the UE with, and is a set of data which are transmitted and/or delivered, and processed by a processor and/or each element of exemplary embodiments in the content delivery system.

In step S545, the cache control device 500 receiving the content response message transmits an ACK message for acknowledging the reception of the content response message to the content server 700. Also, in step S560, the UE 100 transmits an ACK message for acknowledging the reception of the content response message. The ACK message is delivered to the cache control device 500 via the cache device 300.

During the above-described transmission of the content response message, the cache control device 500 having determined the service type performs a corresponding process (or operation) to include the information response indicator in the content response message and delivers the content response message to the cache device 300 in step S550. The information response indicator indicates any one determined service (e.g., the first service). In other words, the cache control device 500 notifies the cache device 300 of the determined service type through the information response indicator.

As described above, when the content request message is received, the cache device 300 inquires of the cache control device 500 the type of a service to be provided through the information request indicator. With reference to the service list, the cache control device 500 determines the type of a service to be provided. After that, in response to the enquiry, the cache control device 500 notifies the cache device 300 of the service type through the information response indicator. In this way, both the cache device 300 and the cache control device 500 share the determined service type. After that, the cache device 300 and the cache control device 500 provide the corresponding service according to the determined service type.

Figure 6:
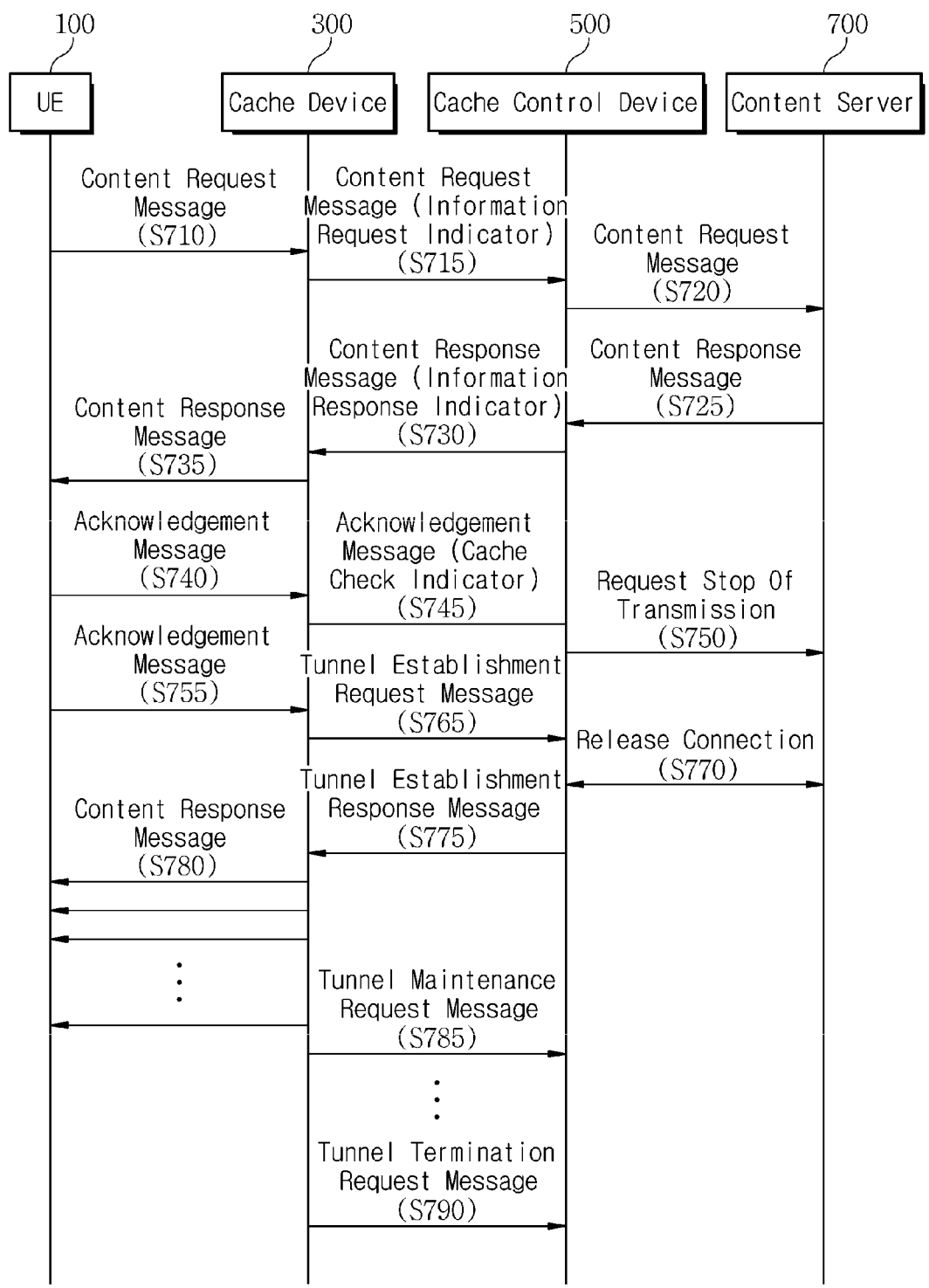
FIG. 6 is a flowchart of a method of delivering content according to exemplary embodiments of the present disclosure.

FIG. 6 is a flowchart of a method of delivering content according to exemplary embodiments of the present disclosure.

Referring to FIG. 6, as described above in FIG. 4, it is assumed that the connection between the UE 100 and the cache control device 500 and the connection between the cache control device 500 and the content server 700 have been established.

In step S710, the UE 100 transmits a content request message. The content request message is, for example, an HTTP GET message. When the content request message is received, the cache device 300 performs a corresponding process (or operation) to include an information request indicator for requesting a service type in the content request message. After that, in operation S715, the cache device 300 transmits the content request message including the information request indicator to the cache control device 500. Then, the cache control device 500 finds (or checks or identifies) the information request indicator from the content request message. After that, in step S720, the cache control device 500 transmits the content request message to the content server 700.

The content server 700 receiving the content request message divides content into pieces of unit data. The content server 700 sequentially performs a corresponding process (or operation) to include the divided pieces of unit data in content response messages and transmits the content response messages to the cache control device 500 in order to provide the UE 100 with the requested content. Step S725 shows that the content server 700 performs a corresponding process (or operation) to include some leading pieces of unit data of the content including the plurality of pieces of unit data in a content response message and transmits the content response message to the cache control device 500. Some pieces of unit data are sequentially or simultaneously transmitted through a content response message. For example, a content response message is an HTTP response message.

Meanwhile, the cache control device 500 extracts a domain from at least one of the content request message received in step S715 and the content response message received in step S725 to identify the content server 700. Then, the cache control device 500 determines the type of a service to be provided for the identified content server 700 with reference to the service list.

Therefore, when the service type is determined after the content response message is received from the content server 700, the cache control device 500 performs a corresponding process (or operation) to include an information response indicator indicating the determined service type in the content response message. After that, in step S730, the cache control device 500 transmits the content response message including the information response indicator. The information response indicator indicates the service type and also controls the cache device 300 to provide a corresponding service according to the service type. It is assumed that, in step S730, the cache control device 500 performs a corresponding process (or operation) to include the information response indicator indicating the first service in the content response message and transmits the content response message to the cache device 300.

When the content response message is received, the cache device 300 finds (or check or identifies) that the first service is required to be provided for the transmission of the content through the information response indicator of the content response message. Also, the cache device 300 compares a part (at least one piece of unit data) of the content included in the content response message with stored content. Then, the cache device 300 determines whether or not the cache device 300 itself has the content. After that, in step S735, the cache device 300 transmits the content response message to the UE 100. Here, the cache device 300 transmits the content response message of the content server 700 received through the cache control device 500 to the UE 100.

The UE 100 receiving the content response message determines whether or not a part of the content requested by the UE 100 itself is received, from the received content response message. Then, in step S740, the UE 100 transmits an acknowledgement message. The acknowledgement message is, for example, an ACK message.

In step S745, the cache device 300 receiving the acknowledgement message transmits the acknowledgement message including a cache check indicator when the cache device 300 itself has the content in its entirety. The cache check indicator indicates that the corresponding content is stored.

The cache control device 500 receiving the cache check indicator finds (or checks or identifies) that the cache device 300 stores the corresponding content. Accordingly, in step S750, the cache control device 500 notifies the content server 700 not to stop retransmission caused by a retransmission request but to stop transmission of new unit data (e.g., another unit data of the content (i.e., another chuck or another packet of the content) next to be sequentially transmitted right after having transmitted the previous unit data of the content) related to the content to be provided the UE 100 with.

Meanwhile, the UE 100 transmits an acknowledgement message every time a piece of unit data is received. Accordingly, the UE 100 transmits an acknowledgement message in operation S755. To provide the first service, the cache device 300 acquires information for connection establishment from the acknowledgement message transmitted from the UE 100. After that, the cache device 300 hijacks (or intercept) the connection between the UE 100 and the cache control device 500 (CONNECTION HIJACKING) described in FIG. 4. In this way, the connection between the cache device 300 and the UE 100 is established.

Next, in step S765, the cache device 300 transmits a tunnel establishment request message for requesting tunnel establishment to the cache control device 500. In step S770, the cache control device 500 receiving the tunnel establishment request message from the cache device 300 releases the connection having established with the content server 700. After establishing a tunnel with the cache device 300, the cache control device 500 transmits a tunnel establishment response message for indicating that the tunnel has been established to the cache device 300 in step S775.

Meanwhile, in step S780, the cache device 300 performs a corresponding process (or operation) to include the content in a content response message and transmits the content response message to the UE 100. At this time, the cache device 300 continuously transmits pieces of unit data subsequent to the some pieces of unit data which are a previously transmitted part of the content. This continues until all the content is transmitted. When the cache device 300 performs a corresponding process (or operation) to include the content in the content response message and transmits the content response message to the UE 100, the cache device 300 performs a corresponding process (or operation) to disguise the content response message as a content response message transmitted from the content server 700 using the IP address of the content server 700 and transmits the disguised content response message to the UE 100.

The tunnel previously established between the cache device 300 and the cache control device 500 is terminated unless updated before an expiration time. Therefore, while the transmission of the content continues, the cache device 300 periodically transmits a tunnel maintenance request message for requesting the maintenance of the tunnel to the cache control device 500 in operation S785. Then, the cache control device 500 updates the expiration time to maintain the tunnel. When the cache device 300 transmits all the content to the UE 100, the cache device 300 transmits a tunnel termination request in step S790. Then, the cache control device 500 terminates the tunnel. Accordingly, the cache control device 500 recognizes that all the content has been transmitted.

Figure 7:
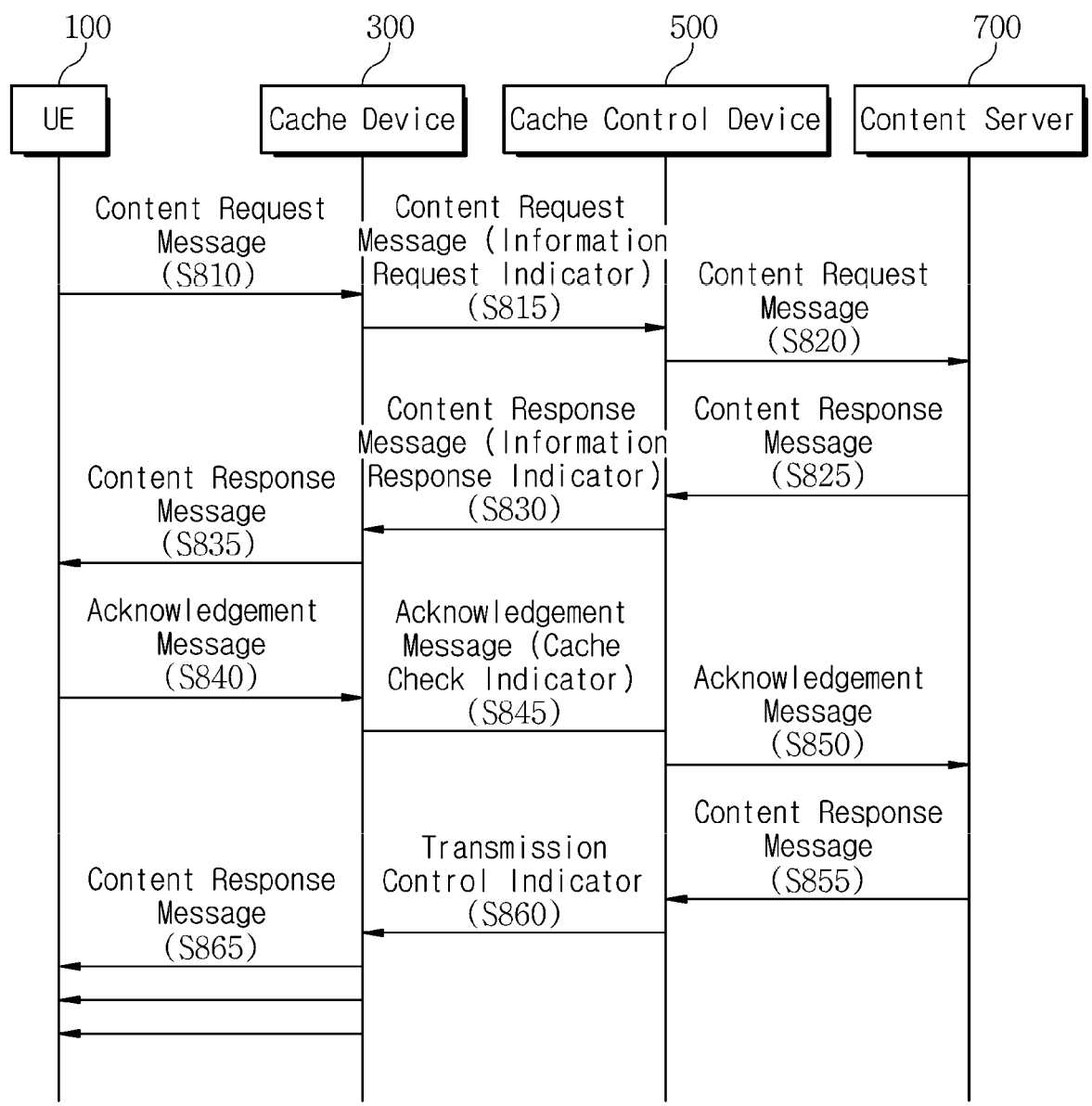
FIG. 7 is a flowchart of a method of delivering content according to exemplary embodiments of the present disclosure.

FIG. 7 is a flowchart of a method of delivering content according to exemplary embodiments of the present disclosure.

Referring to FIG. 7, as described above in FIG. 4, it is assumed that the connection between the UE 100 and the cache control device 500 and the connection between the cache control device 500 and the content server 700 have been established. Steps S810 to S845 of FIG. 7 are performed through the same process as steps S710 to S745 of FIG. 6, as described above, corresponding descriptions of which are also applied to steps S810 to S845 of FIG. 7.

In step S810, the UE 100 transmits a content request message. Then, the cache device 300 receives the content request message and performs a corresponding process (or operation) to include an information request indicator in the content request message. After that, in step S815, the cache device 300 transmits the content request message including the information request indicator to the cache control device 500. Subsequently, the cache control device 500 finds (or checks or identifies) the information request indicator and then, in step S820, transmits the content request message to the content server 700. The content server 700 receiving the content request message divides content into pieces of unit data. After that, the content server 700 performs a corresponding process (or operation) to sequentially include some of the pieces of unit data divided in step S825 in a content response message and transmits the content response message.

The cache control device 500 receiving the content response message determines a service type for the transmission of the content with reference to a service list. After that, the cache control device 500 performs a corresponding process (or operation) to include an information response indicator indicating the determined service type in the content response message. After that, in step S830, the cache control device 500 transmits the content response message including the information response indicator. It is assumed that, at this time, the cache control device 500 includes the information response indicator indicating the second service in the content response message and transmits the content response message.

When the content response message is received, the cache device 300 finds (or checks or identifies) that the second service is required to be provided for the transmission of the content through the information response indicator of the content response message. Also, the cache device 300 compares a part of the content included in the content response message with stored content to determine whether or not the content is stored. After that, in step S835, the cache device 300 transmits the content response message to the UE 100.

The UE 100 receiving the content response message determines that a part of the content requested by the UE 100 itself is received, from the received content response message. Then, in step S840, the UE 100 transmits an acknowledgement message. The cache device 300 receiving the acknowledgement message determines whether or not the cache device 300 itself has the content in its entirety. After that, in step S845, the cache device 300 transmits a cache check indicator indicating that the cache device 300 itself has the content and the acknowledgement message to the cache control device 500. The cache control device 500 receiving the cache check indicator and the acknowledgement message finds (or checks or identifies) that the cache device 300 stores the content. In step S850, the cache control device 500 transmits the acknowledgement message to the content server 700.

As described above, the content server 700 divides content into a plurality of pieces of unit data and sequentially transmits the plurality of pieces of unit data. In step S855, the content server 700 continuously transmits in sequence pieces of unit data subsequent to the some pieces of unit data which are a previously transmitted part of the content through a content response message.

In step S860, the cache control device 500 sequentially receiving pieces of unit data of the content transmits a transmission control indicator corresponding to the sequentially received pieces of unit data. This transmission control indicator indicates that the cache device 300 is instructed to continuously transmit unit data subsequent to the part of content previously (step S835) transmitted by the cache device 300 to the UE 100. The transmission control indicator is used to reduce traffic between the cache control device 500 and the cache device 300. To this end, the transmission control indicator includes label information for identifying the unit data which is required to be transmitted to the UE 100 by the cache device 300. However, the transmission control indicator does not include all the unit data to be transmitted. The label information is generated in various ways. For example, the cache control device 500 compresses all or a part of the subsequent unit data transmitted by the content server 700 and use the compressed subsequent unit data as the label information. Alternatively, the cache control device 500 generates a hash value from the subsequent unit data transmitted by the content server 700 using a hash algorithm which has been determined in advance between the cache control device 500 and the cache device 300. Also, the cache control device 500 uses the generated hash value as the label information.

The cache control device 500 transmits the transmission control indicator including the label information for identifying the unit data. Then, in step S865, the cache device 300 transmits the unit data to the UE 100 according to the label information of the transmission control indicator. For example, when the cache control device 500 transmits a hash value, the cache device 300 extracts unit data having the hash value and transmits the extracted unit data to the UE 100. Like in the foregoing case, when the cache device 300 transmits the unit data of content corresponding to the label information of the transmission control indicator to the UE 100, the cache device 300 also disguises the unit data as data transmitted from the content server 700 using the IP address of the content server 700 and transmit the disguised unit data in step S865.

Figure 8:
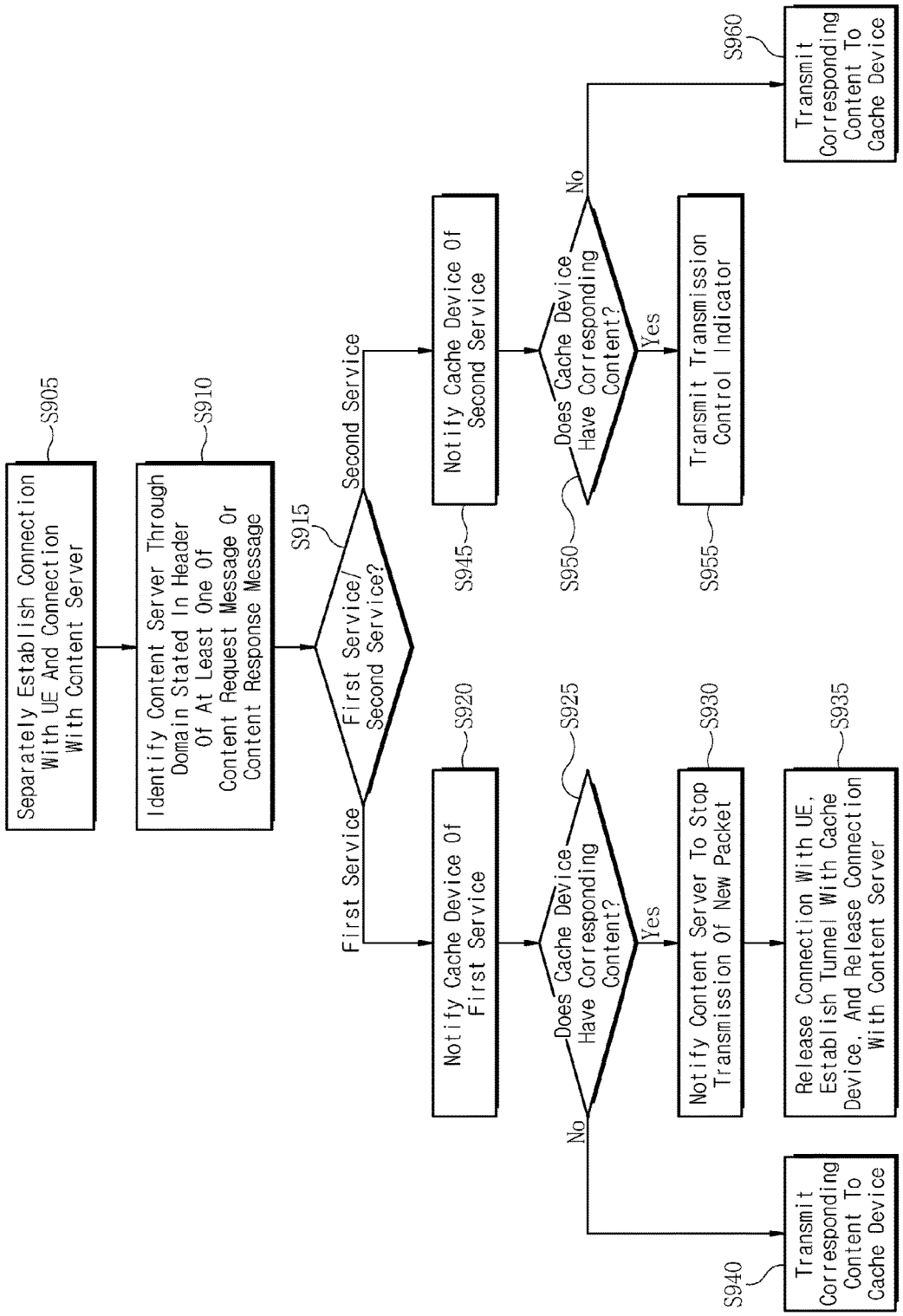
FIG. 8 is a flowchart of a content delivery method of a cache control device according to exemplary embodiments of the present disclosure.

FIG. 8 is a flowchart of a content delivery method of a cache control device according to exemplary embodiments of the present disclosure.

Referring to FIG. 8, in step S905, the control module 530 exchanges messages with the UE 100 and the content server 700 through the interface module 510. In this way, the cache control device 500 separately establishes a connection with the UE 100 and a connection with the content server 700. Such a connection establishment process is as described with reference to FIG. 4.

The UE 100 transmits a content request message to request content from the content server 700. In response to the content request message, the content server 700 transmits a content response message to the UE 100. Here, the control module 530 receives the content request message and the content response message through the interface module 510. Therefore, in step S910, the control module 530 identifies the content server 700 through a domain stated in the header of at least one of the content request message and the content response message.

After that, in step S915, the control module 530 determines whether the type of a service for the previously (step S910) identified content server 700 is the first service or the second service with reference to a service list stored in the storage module 520. In other words, the control module 530 determines the type of a service to be applied when the content server 700 transmits the content requested by the UE 100. When the service type is determined as the first service, the process proceeds to step S920, and when the service type is determined as the second service, the process proceeds to step S945.

When the service type is the first service, the control module 530 notifies the cache device 300 that the type of a service to be provided for the corresponding content transmission is the first service through the interface module 510 in step S920. For example, the control module 530 provides the notification of the service type by transmitting a content response message including an information response indicator to the cache device 300.

After that, in step S925, the control module 530 determines whether or not the cache device 300 has the content which is a target for the first service. To this end, the control module 530 transmits a part of the content transmitted from the content server 700 to the cache device 300 through the interface module 510. Then, the cache device 300 compares the part of the content with content stored therein, and determines that the cache device 300 itself has the content when the part of the content is the same as content stored in the cache device 300. Accordingly, the cache device 300 transmits a cache check indicator providing a notification that the cache device 300 itself stores the content to the cache control device 500. Therefore, when the cache check indicator is received through the interface module 510, the control module 530 determines that the cache device 300 stores the content.

When it is determined that the cache device 300 has the content, the control module 530 notifies the content server 700 through the interface module 510 not to transmit the content any more in step S930. Accordingly, the content server 700 stops the content transmission except for the case of retransmission caused by a request of the UE 100. After that, in step S935, the control module 530 releases the previously (step S905) established connection with the UE 100, establishes a tunnel with the cache device 300, and then releases the connection with the content server 700.

On the other hand, when it is determined in step S925 that the cache device 300 does not have the content, the control module 530 transmits pieces of the content which are sequentially received from the content server 700 to the cache device 300 in step S940.

Meanwhile, when it is determined in step S915 that the service type is the second service, the control module 530 notifies the cache device 300 that the type of a service to be provided for the corresponding content transmission is the second service through the interface module 510 in step S945.

After that, in step S950, the control module 530 determines whether or not the cache device 300 has the content which is a target for the second service. Like in step S925, when a cache check indicator is received from the cache device 300, the control module 530 determines that the cache device 300 stores the content.

When it is determined in step S950 that the cache device 300 has the content, the control module 530 transmits a transmission control indicator including label information to the cache device 300 through the interface module 510 in step S955. According to the label information, the cache device 300 transmits unit data identical to unit data of the content transmitted by the content server 700.

On the other hand, when it is determined in step S950 that the cache device 300 does not have the content, the control module 530 transmits pieces of the content which are sequentially received from the content server 700 to the cache device 300 through the interface module 510 in step S960.

Figure 9:
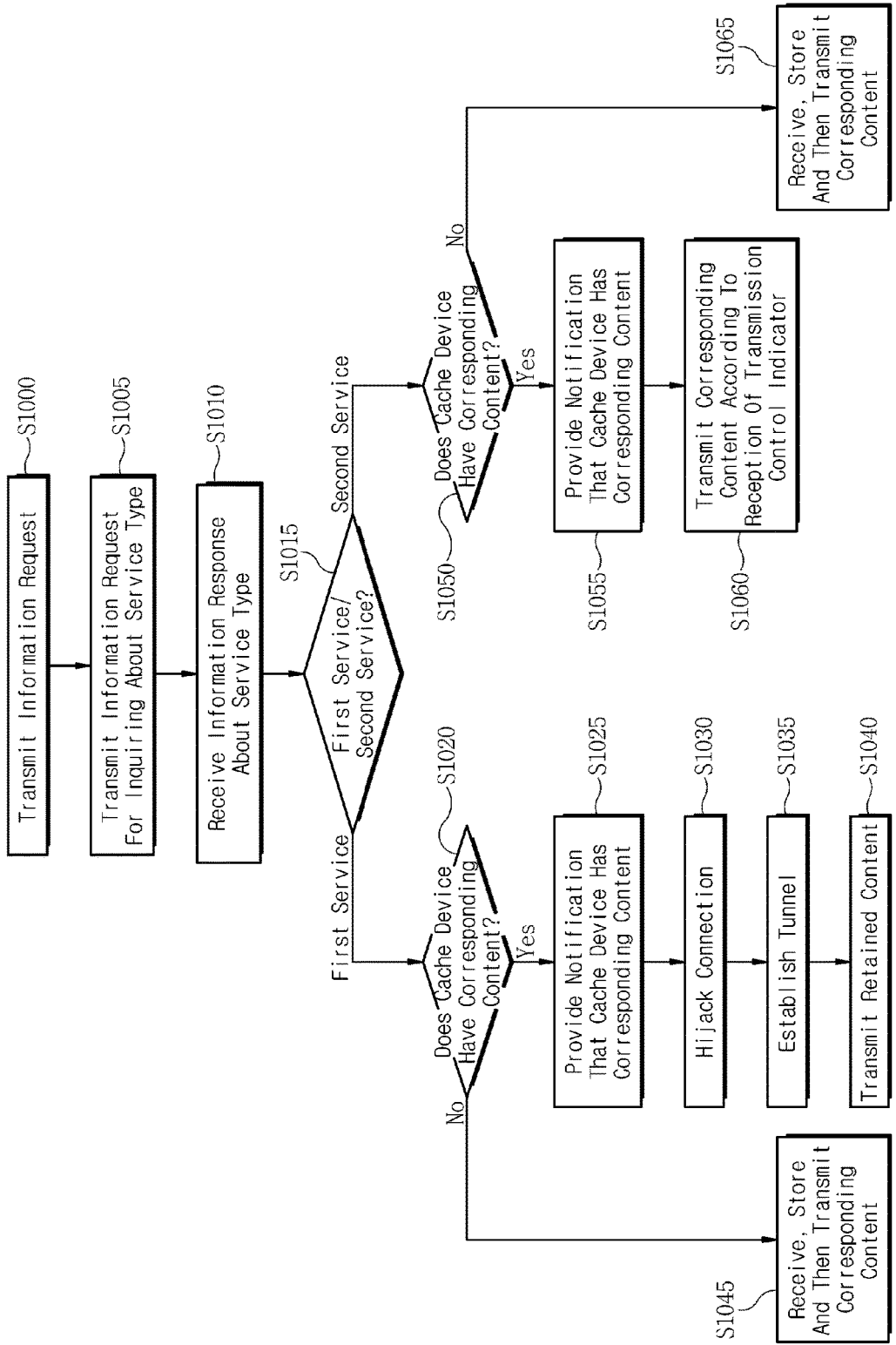
FIG. 9 is a flowchart of a content delivery method of a cache device according to exemplary embodiments of the present disclosure.

FIG. 9 is a flowchart of a content delivery method of a cache device according to exemplary embodiments of the present disclosure.

Referring to FIG. 9, as described with reference to FIG. 4, it is assumed that the connection between the UE 100 and the cache control device 500 and the connection between the cache control device 500 and the content server 700 have been established. Also, the control unit 330 receives data transmitted by the UE 100 and data transmitted by the content server 700 through the interface unit 310.

When the UE 100 transmits a content request message for requesting content to the content server 700, the control unit 330 receives the content request message through the interface unit 310 in step S1000. After that, in step S1005, the control unit 330 transmits the content request message including an information request indicator to the cache control device 500 through the interface unit 310. Here, the information request indicator serves to inquire a service type.

Then, the cache control device 500 includes an information response indicator in a content response message transmitted from the content server 700 and transmits the content response message. Here, the information response indicator indicates the type of a service to be provided for the content.

Accordingly, in step S1010, the control unit 330 receives the content response message including the information response indicator. Then, in step S1015, the control unit 330 determines whether a service to be provided for the content is the first service or the second service according to the service type indicated by the information response indicator.

When it is determined in step S1015 that the service is the first service, the control unit 330 determines in step S1020 whether corresponding content is stored. The storage unit 320 has the first storage space assigned for the first service. Therefore, the control unit 330 determines whether or not there is the content in the first storage space using a part of content of the received content response message.

Assuming that it is determined in step S1020 that there is the content, the control unit 330 transmits a cache check indicator, indicating that there is the content, to the cache control device 500 through the interface unit 310 in step S1025. The cache control device 500 receiving the cache check indicator notifies the content server 700 not to transmit the content. Also, in step S1030, the control unit 330 hijacks the connection between the UE 100 and the cache control device 500 and establishes a connection between the cache device 300 and the UE 100. After that, in step S1035, the control unit 330 transmits a tunnel establishment request message for requesting tunnel establishment through the interface unit 310, thereby establishing a tunnel with the cache control device 500. Then, in step S1040, the control unit 330 transmits the retained content to the UE 100 through interface unit 310.

On the other hand, assuming that it is determined in step S1020 that there is no content, then the control unit 330 stores the content received from the cache control device 500 through the interface unit 310 in step S1045. Also, the control unit 330 transmits the stored content to the UE 100 through the interface unit 310.

Meanwhile, when it is determined in step S1015 that the service is the second service, the control unit 330 determines in step S1050 whether there is corresponding content. The storage unit 320 has the second storage space assigned for the second service. Therefore, the control unit 330 determines whether or not there is the content in the second storage space using a part of content of the content response message received from the cache control device 500.

Assuming that it is determined in step S1050 that there is the content, the control unit 330 transmits a cache check indicator, indicating that there is the content, to the cache control device 500 through the interface unit 310 in step S1055.

When it is found that the cache device 300 has the content, the cache control device 500 transmits a transmission control indicator including label information. Through the transmission control indicator, the cache control device 500 reduces traffic in the core network 400. Then, in step S1060, the control unit 330 transmits unit data constituting the content to the UE 100 through the interface unit 310 according to the label information of the received transmission control indicator. In other words, the control unit 330 transmits unit data of the retained content identified using the received label information to the UE 100. For example, when the cache control device 500 transmits a hash value, the control unit 330 extracts unit data having the hash value from the storage unit 320. After that, the control unit 330 transmits the extracted unit data through the interface unit 310. On the other hand, when it is found that the cache device 300 does not have the content, the cache control device 500 stores the content received from the cache control device 500 through the interface unit 310 in step S1065. After that, the control unit 330 transmits the stored content to the UE 100.

According to various embodiments of the present disclosure, in the case of a first service, transmission of a content server is stopped, and a cache device alone delivers content to user equipment (UE), so that the load of the corresponding process put on the content server itself is able to be removed. Since such a cache server is disposed in an access network, a transmission rate is improved. In the case of a second service, data transmitted from the content server is not actually delivered. Rather, a cache control device controls the cache device to transmit the same data through a transmission control indicator including label information. Accordingly, while the load of the content server remains as it is, traffic in a network is reduced and transmission delay is prevented. In particular, various embodiments of the present disclosure make it possible to identify a service target from a message transmitted and received between the UE and the content server. Also, various embodiments of the present disclosure make it possible to manage targets according to service types through a service list, such as the first service and the second service. Accordingly, various embodiments of the present disclosure provide differentiated services according to service types. Such a method of delivering content according to embodiments of the present disclosure is implemented as a computer-readable code in a non-transitory computer-readable recording medium. The non-transitory computer-readable recording medium separately includes program instructions, data files, data structures, etc. or includes a combination thereof. The non-transitory computer-readable recording medium includes all types of recording devices in which data readable by a computer system is stored. Examples of the non-transitory computer-readable recording medium include magnetic media, such as a hard disk, a floppy disk, and a magnetic tape, optical media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory.

In addition, the non-transitory computer-readable recording medium is distributed in computer systems connected via a network so that non-transitory computer-readable codes are stored and executed in the non-transitory computer-readable recording medium. Functional programs, codes, and code segments used to implement one or more embodiments of the present disclosure can be deduced by programmers in the technical field to which the present disclosure pertains.

Some embodiments for exemplifying the technical spirit of the present disclosure have been described and shown above, but the present disclosure is not limited to shown and described constitutions and effects. Those of ordinary skill in the art appreciate that various changes and modifications of the present disclosure can be made without departing from the spirit and scope of the claimed invention. Specific terms used in this disclosure and drawings are used for illustrative purposes and not to be considered as limitations of the present disclosure. Therefore, it is to be understood that all suitable changes, modifications, and equivalents fall within the scope of the claimed invention.

What is claimed is:

1. A cache control device for content delivery, comprising:
    an interface module, including a communication module implemented by application-specific integrated circuits (ASICs) to transmit and/or receive to and/or from a cache device and a content server, configured to communicate with the cache device and the content server;
    a storage module, including at least one non-transitory computer-readable recording medium, configured to store a service list in which service types of respective content servers are recorded; and
    a control module, implemented by application-specific integrated circuits (ASICs), configured to
        identify the content server from at least one of (i) a content request message received from the interface module and requesting a content or (ii) a content response message received from the interface module and delivering the content,
        determine a service type of the content server with reference to the service list stored in the storage module, and
        perform control so that an indicator indicating the determined service type is transmitted to the cache device through the interface module,
    wherein when the determined service type is a first service, the control module is configured to
        determine that the cache device stores the content corresponding to the first service when the control module receives from the cache device a cache check indicator indicating notification that the cache device stores the content, and
        notify the content server to stop transmission of the content through the interface module so that the cache device directly transmits the content to user equipment (UE),
    when the determined service type is a second service, the control module is configured to transmit an transmission control indicator including label information identifying unit data of the content to control the cache device through the interface module such that the cache device transmits the unit data of the content to the user equipment (UE) according to the label information, and
    wherein the control module is configured to transmit a part of the content received from the content server through the interface module to the cache device to cause the cache device to determine, based on the part of the content, whether the cache device has the content.

2. A cache device for content delivery, comprising:
    an interface unit, including includes a communication module implemented by application-specific integrated circuits (ASICs) to transmit and/or receive to and/or from a cache device and a content server, configured to communicate with user equipment (UE) and a cache control device;
    a storage unit, including at least one non-transitory computer-readable recording medium, having a storage space configured to store a plurality of contents according to service types; and
    a control unit, implemented by application-specific integrated circuits (ASICs), configured to
        identify a service type through a received indicator indicating a service type of a content server when receiving the indicator from the cache control device through the interface unit, and
        perform control so that content is transmitted to the UE in different ways according to the identified service type,
    wherein when the identified service type is a first service, the control unit transmits to the cache control device a cache check indicator indicating notification that the cache device stores the content, such that the cache control device determines that the cache device stores the content corresponding to the first service, the control unit is configured to perform control so that a piece of content identical to a piece of content among a plurality of pieces of content received from the content server is transmitted to the UE through the interface unit so that the cache device directly transmits the content to user equipment (UE), and when the identified service type is a second service, the control unit is configured to transmit unit data of the content identifiable using an transmission control indicator including label information received through the interface unit to the UE, wherein the control unit is configured to receive a part of the content from the content server through the cache control device and determine, based on the part of the content, whether the cache device has the content.

3. The cache device of claim 2, wherein the storage space includes a first service storage region for storing content corresponding to a first service and a second service storage region for storing content corresponding to a second service, the content stored in the first service storage region is not deleted for a previously set time period, and the content stored in the second service storage region is maintained or deleted according to a frequency of requests for the content.

4. A method performed by a cache control device for content delivery, the cache control device implemented by application-specific integrated circuits (ASICs) to execute the method comprising:

identifying a content server from at least one of a content request message for requesting content or a content response message for delivering the content;

determining a service type of the content server with reference to a service list in which service types of respective content servers are recorded; and transmitting an indicator indicating the determined service type to a cache device, wherein the method further comprising:

determining that the cache device stores the content corresponding to the first service when the control module receives from the cache device a cache check indicator indicating notification that the cache device stores the content, after the transmitting of the indicator, notifying the content server to stop transmission of the content when the determined service type is a first service so that the cache device directly transmits the content to user equipment (UE), and after the transmitting of the indicator, transmitting a transmission control indicator including label information to control the cache device when the determined service type is a second service so that the cache device transmits unit data of the content identified according to the label information to the user equipment (UE), wherein the cache control device transmits a part of the content received from the content server to the cache device to cause the cache device to determine, based on the part of the content, whether the cache device has the content.

5. The method of claim 4, further comprising:

after the transmitting of the indicator, notifying the content server to stop transmission of the content when the determined service type is a first service.

* * * * *